May 6, 1924.
W. L. WALKER
VISUAL AND AURAL DETERMINATION OF DIRECTION AND DISTANCE OF SOUND
Filed Jan. 10, 1918  2 Sheets-Sheet 2
1,492,589
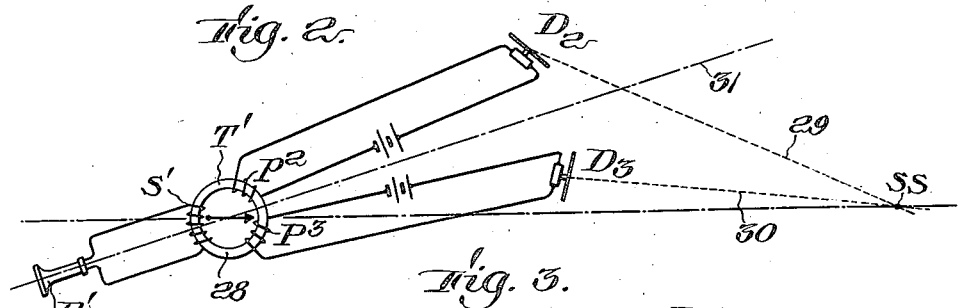
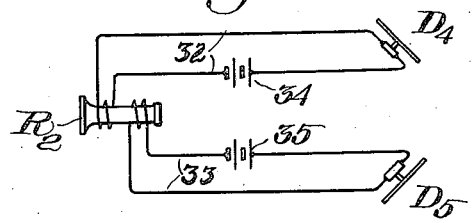
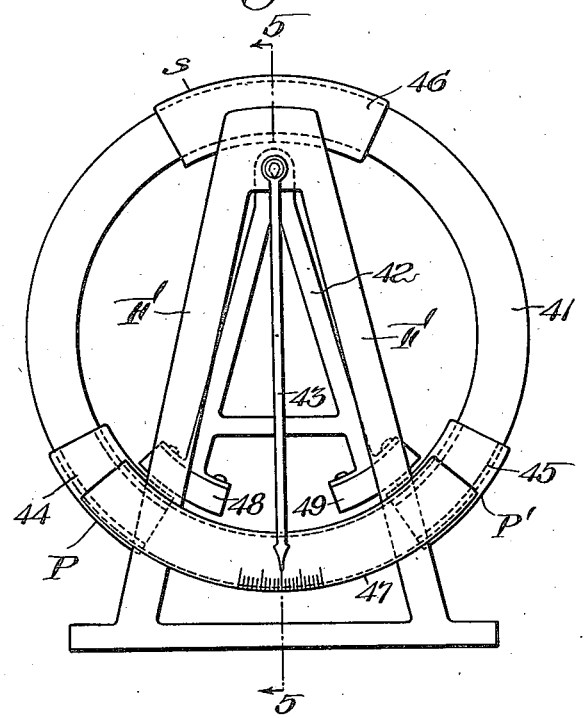
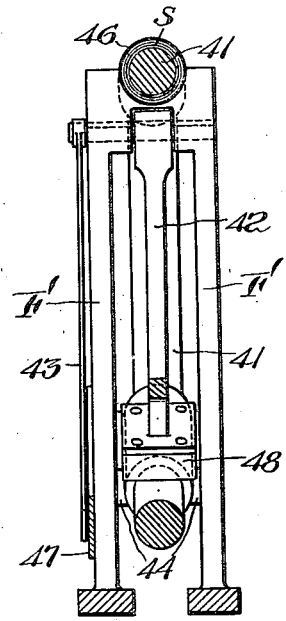
Inventor:
William L. Walker,
by Roberts Roberts & Cushman
his Attorneys.

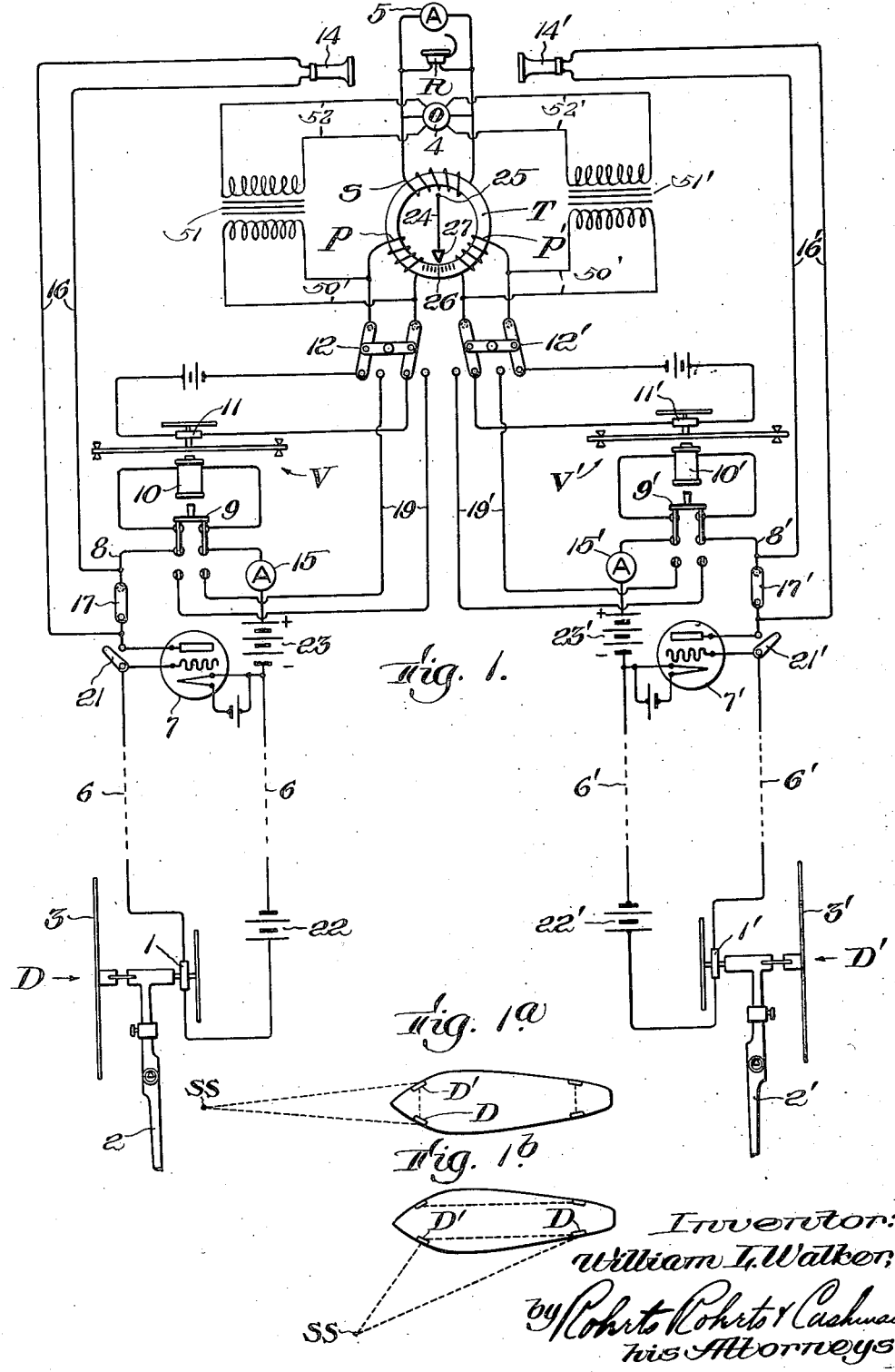

Patented May 6, 1924.

1,492,589

UNITED STATES PATENT OFFICE.

WILLIAM L. WALKER, OF NEW YORK, N. Y., ASSIGNOR TO WALKER SIGNAL & EQUIPMENT CORPORATION, OF NEW YORK, N. Y., A CORPORATION OF DELAWARE.

VISUAL AND AURAL DETERMINATION OF DIRECTION AND DISTANCE OF SOUND.

Application filed January 10, 1918. Serial No. 211,265.

*To all whom it may concern:*

Be it known that I, WILLIAM L. WALKER, a citizen of the United States, and resident of New York, in the county of New York and State of New York, have invented new and useful Improvements in Visual and Aural Determination of Direction and Distance of Sound, of which the following is a specification.

This invention relates to the detection of sound and to the determination of the location of a source of sound and more particularly to the detection and location of submarine sound emanations. Certain phases of the present disclosure are set forth in my prior applications Serial No. 161,179, filed April 11, 1917; Serial No. 176,299, filed June 22, 1917; Serial No. 202,680, filed Nov. 19, 1917, and Serial No. 210,380, filed January 4, 1918, and I hereby make reference to these application for a more complete disclosure of such phases of the present disclosure.

The principal objects of the present invention are to detect vibratory waves of audible frequency and of a certain character to the exclusion of waves of sounds of different character and to determine the location of the source of the detected sound waves. The present invention is more particularly concerned in determining the direction of the source of sound but the distance as well as the direction of the source may be determined according to the present invention. In the present case I preferably employ means for excluding interfering sounds from the indicating mechanism of the detecting system, but inasmuch as no such interference is met with under some conditions of operation such means is essential only in the more limited aspect of the invention.

Other objects of the invention will be apparent from the following description and the accompanying drawings, in which,—

Figure 1 is a diagrammatic view of one embodiment of my improved system;

Figure 1ª is a diagram illustrating one manner of applying the system to a vessel;

Figure 1ᵇ is a diagram illustrating another manner of applying the system to a vessel;

Figure 2 is a diagram showing a modified form of the invention;

Figure 3 is a diagram showing a still further modification of the invention;

Figure 4 is a side elevation of an improved indicator, parts being broken away; and Figure 5 is a transverse section of the indicator taken on line 5—5 of Fig. 4.

The particular embodiment of the invention illustrated in Fig. 1 comprises a pair of sound detecting, or receiving devices D and D' disposed in spaced relationship, as for example on opposite sides of a vessel or other vehicle as indicated in Fig. 1ª or on the same side of a vessel as indicated in Fig. 1ᵇ, and indicating apparatus such as an oscillograph 4, a telephone receiver R, or a milliammeter 5, which is preferably located in the chart room or pilot house of the vessel when the system is installed on board a vessel, together with certain apparatus connected in circuits leading from the detectors D and D' beneath the surface of the water to the indicating apparatus. Each of the circuits leading from the detectors to the indicators is separate and distinct until the circuits reach the transformer T where the individual circuits are connected differentially to the primary windings P and P' of the transformer in such manner as conjointly to induce current in the secondary winding S, to which the indicating instruments may be directly connected.

Each of the individual circuits leading from the respective detectors D and D' to the transformer T is comprised as follows: The microphone 1 is mounted on an oscillatory lever arm 2 and is actuated by a sound-receiving diaphragm exposed to the water outside the vessel or otherwise arranged to receive sound vibrations transmitted through the water or other medium, the construction of the microphone and method of actuation preferably being similar to that disclosed in my said application Serial No. 202,680. The receiver 1 is connected by conductors 6 to the input terminals of an audion or thermionic tube 7, the output circuit 8 of which is connected to the central terminals of a double-pole double-throw switch 9. The upper pair of end terminals of the switch 9 are connected to the electromagnet 10 of a vibrator device such as disclosed in my said application Serial No. 210,380.

The microphone 11 carried by the vibrator V is connected to the primary winding P through the medium of a double-pole double-throw switch 12. When the switches are arranged as shown in the drawing current variations produced by the receiver 1 are transmitted to the audion 7 where they are amplified and rectified and transmitted to the electromagnet 10. The vibrator V is actuated by the electromagnet 10 and in turn actuates the microphone 11 to produce current variations in the primary winding P.

As explained in my said application Serial No. 210,380, the vibrator V may be adjusted predominantly to reproduce a sound of a particular character so that when properly adjusted it transmits or reproduces the component of the sound reaching microphone 1 corresponding to the sound to be detected. For example, if it is desired to detect a particular sound from a miscellany of sounds the vibrator V is adjusted predominantly to reproduce the particular sound and this sound will then be transmitted to the primary winding P whereas the other sounds will not be reproduced by the vibrator V except to a relatively small extent. Moreover the detectors D and D' may be tuned to particular sounds by varying the weight of the lever arms; by varying the adjustable weights along the lever arms, by varying the thickness or stiffness of the diaphragms, by employing damping rings on the diaphragms, or in other suitable manner.

When the detectors D and D' are connected to the primaries P and P' respectively and in the same manner, as illustrated in Fig. 1, and when the two circuits so connecting the detectors to the transformer primaries are adjusted in like manner sounds, received by the detectors will produce opposite effects in the transformer inasmuch as the primary windings P and P' are wound in opposite directions as shown.

Thus if the detectors be mounted on a vessel as illustrated in Fig. 1ª and if the vessel be pointing directly toward the source of sound SS the detectors will be affected in equal degree and the currents in the primary windings P and P' will just balance each other, whereas if the vessel be directed to one side of the source of sound one of the detectors will be affected to a greater degree than the other and consequently heavier variations of current will be produced in the primary winding connected to the detector which is affected to a greater extent. The unbalanced current in the primary windings P and P' will induce a current in the secondary S proportional to the difference between the currents in the primary windings P and P'. Thus, while the system so far as already explained will not indicate on which side of the vessel the source of sound is located, it will indicate when the vessel is pointing directly toward the source of sound. Obviously instead of locating the detectors on the port and starboard sides of the vessel at the forward and aft ends thereof, they might both be placed on the sides of the vessel near the bow and stern respectively as illustrated in Fig. 1ᵇ so as to indicate when the vessel is squarely broadside of the source of sound.

In order to determine on which side of the vessel the source of sound is located when the vessel is not pointing directly toward the source, I preferably provide auxiliary indicating devices such as receivers 14 or milliammeters 15. These auxiliary devices may be operatively connected to the detectors D and D' in any suitable manner, but I preferably connect them to the the circuits leading from the detectors at points beyond the audion 7. Thus, in Fig. 1, I have illustrated circuits 16 and 16' connecting the receivers 14 and 14' to the output circuits 8 and 8' of the audions 7 and 7', switches 17 and 17' being provided to short-circuit the auxiliary indicating devices when their use is not required. The milliammeters 15 and 15' are preferably connected directly in the output circuits of the audions as illustrated.

Under certain conditions of operation it may be desirable to connect the detectors either directly to the indicating mechanism or indirectly to the indicating mechanism through the audions to the exclusion of the vibratory devices V and V'. For example, if there are no interfering sounds impinging upon the detectors the vibratory devices V and V' may be eliminated from the circuits and when the sound reaching the detectors, which it is desired to transmit to the indicating mechanism, is of sufficient intensity the detectors may be connected directly to the indicating mechanism instead of through the audions. In the system illustrated in Fig. 1 the vibratory devices V and V' may be cut out of the circuits by throwing the switches 12 and 12' from the outer sets of contacts to the inner sets of contacts and by throwing the switches 9 and 9' down. The circuit from each detector to the transformer would then comprise conductors 6, audion 7, conductors 8 and conductors 19. To connect the detectors directly to the primary windings of the transformer T, the switches 9 and 9' are thrown down, the switches 12 and 12' are thrown to their inner sets of contacts, and the switches 21 and 21' are closed, so that the circuit from each detector to the transformer will comprise conductors 6, conductors 8, switch 9, conductors 19, switch 12 and the conductors leading to the transformer. In the event that it is desired to cut out the audions 7 without cutting out the vibrators V and V', the switches 21 and 21' are closed so as to short-circuit the audions, the switches 9 and 9' are thrown into upper position, and the switches 12 and 12' are thrown to the outer contacts, in which event the circuit from each detector to the transformer comprises conductors 6, conductors 8, switch 9 in its upper position, vibrator V and switch 12 in the outer position shown in Fig. 1.

The batteries 22 and 22' in the circuits 6 and 6' supply current to the receivers 1 and 1', and when the audions are short circuited by switches 21 and 21' the batteries 22 and 22' cooperate respectively with the batteries 23 and 23' to produce positive potentials on the plate and grid elements of the audions whether the microphones be connected to the vibrators V and V' respectively or directly to the primary windings of the transformers through the switches 9 and 9' in their lower positions.

Instead of using a single microphone 1 with each of the detectors a plurality of microphones may be employed either in series or in parallel as more fully set forth in my prior application, Serial No. 210,380.

In order to afford a further indication of the direction of the source of sound reaching the detectors a magnetic pointer may be associated with the transformer T as illustrated at 24 in Fig. 1. The pointer 24 is pivotally mounted at 25 to swing in the plane of the transformer T so that the free end of the pointer will move along a graduated scale 26 disposed between the primary windings P and P'. The normal position of the pointer 24 is that shown in Fig. 1, namely, half way between the ends of the primary windings P and P'. While any suitable means may be provided normally to maintain the pointer in this position I preferably mount the transformer in a vertical plane so that the pointer will be held in normal position by gravity. When the primary windings P and P' are equally energized the strength of the poles of the two windings will be equal and the pointer will be permitted to stand in normal position. However, if one of the windings is energized to a greater extent than the other the pointer will be pulled toward the winding which is energized to a greater degree. Owing to the fact that the primary windings are differentially wound the poles produced at the lower end of the windings will be of like polarity and if the poles are of equal strength the attraction for the pointer 24 will be equal, but as above stated when one of the windings is energized to a greater degree than the other the attraction upon the pointer by the lower poles of the respective windings will become unbalanced and the pointer will swing to the right or left, thereby indicating that one detector is receiving a greater volume of sound than the other and that therefore the source of sound is not directly ahead of the vessel but to one side thereof. In order that the direction of the pointer 24 shall be proportional to the angular displacement of the source of sound relatively to the longitudinal axis of the vessel the length of the pointer, the weight of the magnetic pole 27 carried at the lower end of the pointer and the other factors governing the deflection of the pointer must be accurately adjusted.

When using the oscillograph 4 the direction of the source of sound may be accurately determined as follows: The oscillograph, which is of the well-known form, has three indicating mirrors, two of which are connected with the respective primary coil leads by means of the conductors 50 and 50', the transformers 51 and 51' and the conductors 52, and 52'. Said transformers 51 and 51' are those commonly used with oscillographs and prevent the direct battery currents from affecting the readings. The variations of the currents in the two primary windings P and P' will be exactly in phase when the vessel is directed toward the source of sound and theoretically there will be no current generated in the secondary winding S. However, when the vessel deviates from the direction of the source of sound the variations of current in the respective primary windings are thrown out of phase owing to the fact that the distances from the source of sound to the respective detectors are different. The oscillograph will indicate the composite wave produced by the vector sum of the component currents in the respective primary windings and the phase difference between the currents in the primary windings will be indicated by the displacements of the individual current waves produced by the receiving devices and recorded by two of the mirrors of the oscillograph. The third mirror will record the composite wave produced by combining the separate current waves from the receiving devices through their resultant inductive effect in the secondary winding of the transformer. A comparison of the phase angles between the three wave records so made will enable the direction of the source of the waves to be determined and a comparison of their amplitudes with amplitudes at known distances will indicate approximately the distance from the receivers. This will be more apparent in view of the diagram shown in Fig. 2 which will now be described.

Two detectors $D_2$ and $D_3$ are disposed in spaced relationship as described in connection with Fig. 1 and are connected directly to differential primary windings $P_2$ and $P_3$ of the transformer T', the secondary S' of the transformer being connected to a receiver R'. If the source of sound be located at point S S the detector $D_3$ would be exposed to the sound wave emanated from the source to a greater extent than would the detector $D_2$. The primary winding $P_3$ would therefore be energized to a different extent than would the primary winding $P_2$ and the pointer 28 would indicate the direction of the source of sound while the receiver R' would merely indicate that the source of sound is not symmetrically disposed with respect to the two detectors. The distances from the source of sound to the detectors $D_2$ and $D_3$ are indicated by the dash lines 29 and 30 and the distance to the detector $D_2$ is obviously greater than to the detector $D_3$. For this reason the variations of current in the primary windings would be out of phase and the degree of phase difference, as indicated for example by oscillographic apparatus, employed as described in connection with Fig. 1 would indicate the angular degree of displacement of the source of sound from the center line 31 of the apparatus.

In Fig. 3 I have illustrated a simplified system comprising two detectors $D_4$ and $D_5$ differentially connected to a receiver $R_2$ through circuits 32 and 33 including batteries 34 and 35. By virtue of the differential windings on the receiver no appreciable sound would be produced in the receiver by a source of sound located directly ahead of the detectors $D_4$ and $D_5$. However as the apparatus is swung to the right or left the detectors $D_4$ and $D_5$ would be actuated in different degree and the receiver $R_2$ would indicate this difference in degree. If when swinging the apparatus to the left the intensity of sound produced by the receiver $R_2$ decreases it would be understood that the source of sound were to the left of the apparatus, whereas if the intensity of sound produced by the receiver increased it would be understood that the source of sound were to the right of the apparatus. While my improved apparatus is particularly adapted to indicate the direction of a source of sound it is also adapted to indicate the approximate distance from the apparatus to the source of sound inasmuch as the intensity of sound reaching the detectors will be proportional to the distance.

Indications of the approximate distance can be obtained by noting the intensity of sound in the telephones 14 and 14' when the switches 17 and 17' are open. Thus the operator is enabled, after some experience, to estimate the approximate distance by comparison of the intensity of the received sound with intensities previously obtained at known distances.

The current indicated by the milliammeters 15 and 15' will vary more or less in accordance with the intensities of the received signals and so will also give an indication from which the approximate distance may be estimated.

If one of the coils P or P' be thrown out of circuit by opening one of the switches 12 or 12', depending on which detector D or D' is more nearly at right angle to the source of sound, the connected coil will alone induce currents in the secondary coil S which will cause the ammeter 5, the receiver R or the oscillograph 4, to give different indications depending on the intensity and distance of the sound waves when compared with known distances.

The improved form of indicating transformer illustrated in Figs. 4 and 5 comprises an annular magnetic core 41 surrounded by primary and secondary windings P, P' and S as in Fig. 1, indicating mechanism including an A-shaped frame 42 and a pointer 43, and a supporting frame F. The windings P, P' and S are insulated from the frame F by means of insulation members 44, 45 and 46 and are symmetrically positioned with respect to a vertical plane through line 5—5. The frame 42 and pointer 43 are fast to a shaft which is mounted on knife edges in the top of frame F. The pointer moves over a scale 47 secured on one side of frame F. At the lower ends of the legs of the frame 42 are mounted magnetic pole pieces 48 and 49, the pole pieces being placed somewhat closer together than the primary windings, P and P' so that the windings tend to pull the pole pieces away from the center line 5—5 when energized. When the two primary windings are equally energized the pole pieces are pulled in equal degree and the pointer stands at the center of the scale. However, if one winding is energized a greater degree than the other the opposing forces become unbalanced and the pointer swings to the right or left as will be understood from the preceding description.

I claim:

1. Apparatus for determining the direction of sources of vibratory energy comprising, electrical receiving devices located at spaced receiving stations adapted to produce variable electric currents which vary in accordance with the intensities of the received waves, thermionic tubes in circuit therewith, coils connected with said tubes for producing magnetic fields whose intensities vary in accordance with said last-named currents, inductive means located within the fields of said coils and adapted to have currents induced therein by said fields which are the result of the currents in said coils, and means for determining the relative intensities of said induced currents.

2. Apparatus for determining the direction of sources of vibratory energy comprising, electrical receiving devices located at spaced receiving stations adapted to produce variable electric currents which vary in accordance with the intensities of the received waves, thermionic tubes in circuit therewith, coils connected with said tubes for producing magnetic fields whose intensities vary in accordance with said last-named currents, inductive means located within the fields of said coils and adapted to have currents induced therein by said fields and which are the result of the currents in said coils, and visual indicating means connected with said inductive means for permitting comparisons of the respective currents therein.

3. Apparatus for determining the direction of sources of vibratory energy comprising electrical receiving devices located at spaced receiving stations adapted to produce variable electric currents which vary in accordance with the intensities of the received waves, thermionic tubes in circuit therewith, coils connected with said tubes for producing magnetic fields whose intensities vary in accordance with said last-named currents, inductive means located within the fields of said coils and adapted to have currents induced therein which are the resultant of the combined effects of said coils, means for aurally determining the intensities of said currents in said inductive means, and visual indicating means for comparing the respective currents in said coils.

4. Apparatus of the character described comprising electrical receiving devices responsive to waves of audible frequency, a transformer, an indicator adapted to be operated by the induced fields thereof, circuits connecting the receiving devices with differentially wound primary coils of the transformer, and supplementary means in circuit with the receivers and the transformer for determining the direction and distance of the source of sound received by the receiving devices.

5. In an apparatus of the kind described, the combination of a plurality of electro-responsive wave receiving devices, a plurality of sources of electric current, each of said sources being associated with one of said receiving devices and controlled thereby independently of the other of said receiving devices, a transformer having primary coils connected individually to said current sources the coils acting in opposition on the magnetic circuit of the transformer, a secondary winding on said transformer, means connected with said secondary winding for aurally determining the effects of the fields of the primary circuits and visual means for comparing the respective currents of said primary circuits for indicating the direction of the source of waves received by said receiving devices.

6. In an apparatus of the kind described, the combination of a plurality of electro-responsive wave receiving devices, a plurality of sources of electric current, each of said sources being associated with one of said receiving devices and controlled thereby independently of the other of said receiving devices, a transformer having primary coils connected individually to said current sources, the coils acting in opposition on the magnetic circuit of the transformer, a secondary winding on said transformer, means connected with said secondary winding for determining the effects of the fields of the primary circuits and visual means for comparing the respective currents of said primary circuits for indicating the direction of the source of waves received by said receiving devices.

7. In an apparatus for determining the direction and distance of a source of sound, the combination of receivers of audible frequency waves, conductors connected therewith, whereby the received waves vary the currents therein in accordance with the distance and direction of the sources thereof, an oscillograph connected with said conductors, means whereby said oscillograph is controlled by said currents simultaneously, and a current indicating instrument operated by the resultant inductive action of said currents.

Signed by me at Boston, Massachusetts, this 31st day of December, 1917.

WILLIAM L. WALKER.